UNITED STATES PATENT OFFICE.

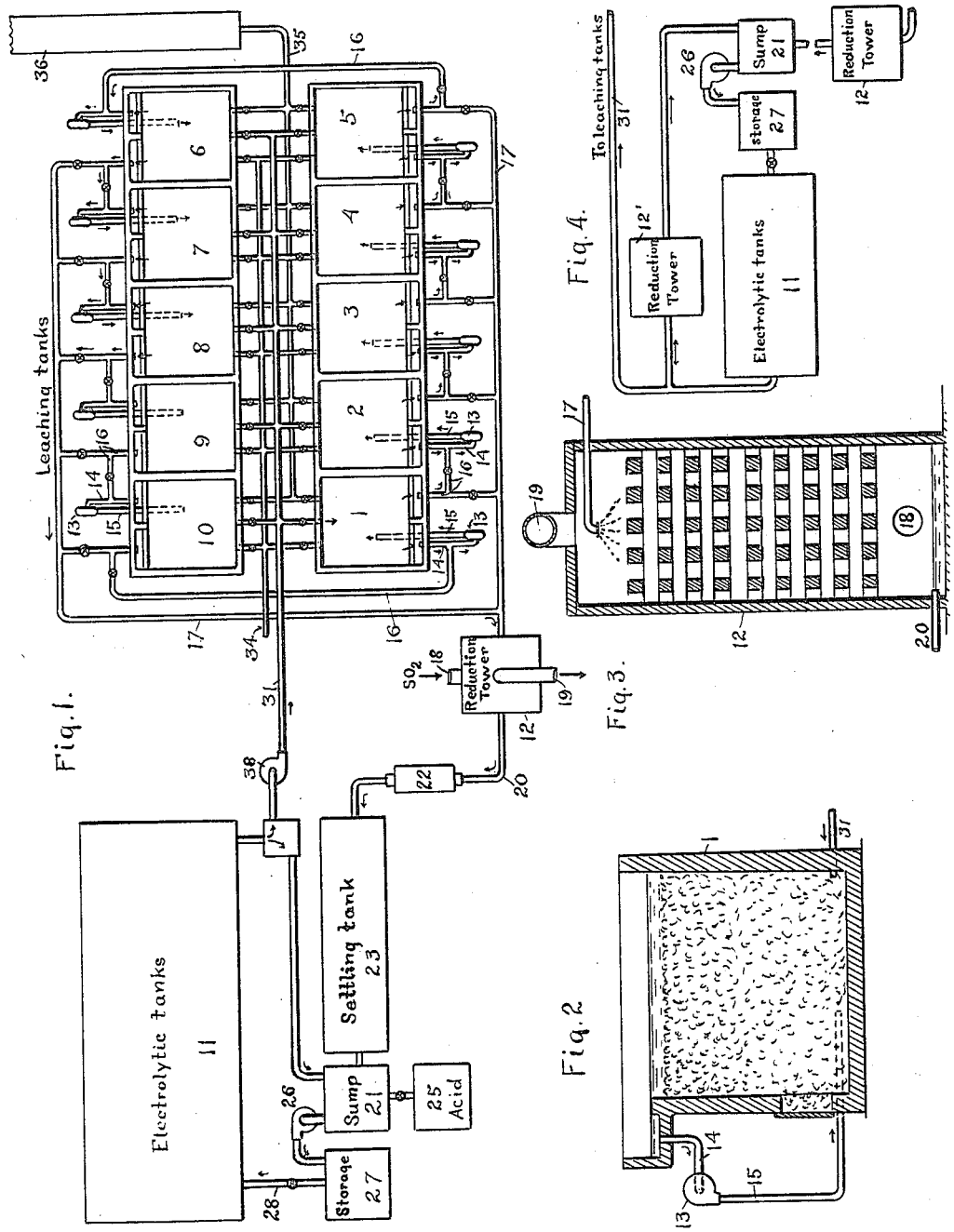

JOHN C. GREENWAY, OF WARREN, ARIZONA, AND HARRY W. MORSE, OF LOS ANGELES, CALIFORNIA.

HYDROMETALLURGY OF COPPER.

1,224,458. Specification of Letters Patent. Patented May 1, 1917.

Application filed June 5, 1916. Serial No. 101,757.

*To all whom it may concern:*

Be it known that we, JOHN C. GREENWAY, a citizen of the United States, residing at Warren, in the county of Cochise and State of Arizona, and HARRY W. MORSE, a citizen of the United States, residing at Los Angeles, in the county of Los Angeles and State of California, have invented a new and useful Improvement in Hydrometallurgy of Copper, of which the following is a specification.

This invention relates to the extraction of copper from ores thereof, particularly from what are known as oxidized ores, for example, oxid, carbonate or silicate ores, or ores which have been oxidized by roasting. In processes for this purpose in which sulfuric acid is used as a leaching agent and in which the copper is recovered from the solution by electrolysis, serious difficulty has been encountered by the tendency to the formation of ferric sulfate in the solution, such ferric sulfate resulting from the action of the solvent on iron contained in the ore. Such ferric sulfate tends to prevent effective and economical electrodeposition of the copper, as it tends to dissolve the cathode deposit of copper, and also to raise the potential difference necessary for electrolysis, thereby causing a waste of electrical energy. Iron in the ferrous form is, however, not open to this objection, and it has been proposed to reduce the ferric sulfate present in the electrolyte to ferrous sulfate, for example, by the action of sulfur dioxid, in such manner that, as electrolysis proceeds, the ferric sulfate formed is reduced to the ferrous state, the solution being continually withdrawn from the electrolytic tanks and subjected to reduction, and then returned to the electrolytic tanks in a continuous circulation. The electrolysis is carried out in acid solution, and it has been found that the reducing operation by sulfur dioxid is comparatively ineffective in such acid solution, it being only possible to obtain a reduction efficiency of about twenty per cent. under the usual conditions of temperature, etc. We have found that reduction efficiency of sulfur dioxid acting on neutral solution, approaches eighty per cent., and in order to obtain this higher reduction efficiency we carry out the process in such manner that reduction of ferric sulfate to ferrous sulfate is effected in a substantially neutral solution. By this procedure we are able to maintain a very low concentration of ferric sulfate in the electrolyte.

The accompanying drawings illustrate an apparatus suitable for carrying out our invention, and referring thereto, Figure 1 is a flow sheet of the apparatus.

Fig. 2 is a vertical section of one of the leaching tanks.

Fig. 3 is a vertical section of the tower in which the reduction is effected.

Fig. 4 is a diagram showing another form of the apparatus for carrying out the invention.

Referring to Fig. 1, the apparatus therein shown comprises one or more leaching tanks indicated at 1 to 10 inclusive, an electrolyzer 11, a tower or apparatus 12 in which the solution is subjected to the action of sulfur dioxid, and pumping apparatus and connections whereby the solution is circulated through the leaching tanks, the apparatus 12 and the electrolyzer.

As shown in the drawings, the leaching tanks may be connected so that the leaching solution passes in series through the tanks, and to get the best results we prefer to so connect the tanks that a local circulation is maintained through each tank and a general circulation or advance is maintained from each tank to the succeeding one. For this purpose a pump 13 may be provided for each tank, having its inlet pipe 14 connected to receive solution from the corresponding tank, and its outlet pipe 5 connected to discharge solution to another part of the same tank. Each tank has also an outlet pipe 16 connected to the inlet pipe 14 of the pump for the next succeeding tank. The connections are preferably such as to provide for upward movement of the solution through the body of ore in the tank. The outlet pipe 16 corresponding to the last tank is connected to a pipe 17 leading to the apparatus 12, which may consist of a tower or similar device adapted to receive the solution and to bring it into contact with sulfur dioxid gas. The pipe 17 may enter the top of this tower or apparatus 12 and be provided with means for distributing the solution over suitable surfaces or otherwise bringing it into contact with the sulfur dioxid gas which is passed upwardly through the apparatus 12 from an inlet 18 to an outlet 19. An outlet pipe 20 for solution leads from the lower part of the apparatus 12 to means which may be provided for acidifying the solution before it proceeds to the electrolyzer 11. Means indicated at 22 may be provided for bringing the effluent from the apparatus 12 in contact with metallic copper, said means discharging into a settling tank 23 whose outlet leads to the sump 21, to which acid may be supplied from tank 25. A pump 26 supplies the electrolyte from the sump to a storage tank 27 whence the electrolyte flows through pipe 28 to the electrolyzer or the electrolytic cells indicated at 11. A part of the acid solution is forced by pump 38, or otherwise, to a supply pipe 31 adapted, through suitable valved connections, or through suitable hose connections, to conduct the acid solution to any one of the series of leaching tanks. Wash water connections may be provided as indicated at 34, and connections 35 are provided for drawing off solution to prevent fouling, such solution passing to a cement copper launder or device 36 for precipitating copper present in the solution by the action of metallic iron. Suitable valves may be provided in all the connections above described, in order to permit the supply connection to be made to any one of the series of leaching tanks, which then becomes the first tank of the series, the liquid circulating through all of the tanks included in the circuit until it reaches the last tank of the operative series and being then discharged through the pipe connection 17, which at that time is in connection with the outlet of said last tank. It will be understood that in general two of the tanks will be cut out of the circulatory system during any period of operation, one tank being washed and discharged and the other being charged during this period, and that the ore is thus replaced successively in the series of tanks in cyclic manner.

The process may be carried out in the above described apparatus as follows: Assuming that the process has been in operation for sufficient time to present the regular procedure, each of the tanks 1 to 8 may contain ore. The leaching solution, which may consist, for example, of a three per cent. aqueous solution of sulfuric acid, passes through pipe 31 to the intake circulatory connections of the first tank indicated at 1, said connections, including pump 13 and pipes 14 and 15, causing the solution to circulate in a local circulation in the said tank through the body of ore therein, preferably so as to pass upwardly through the ore. A portion of the solution passing from pump 13 passes through the connection 16 to the circulatory means for the next tank, indicated at 2, so that for each tank there is a local circulation and also an advance of a portion of the solution to the next succeeding tank; for example, of the total amount of solution passing through the pump 13 one-tenth may pass to the next tank and the remainder be circulated through the tank directly connected to said pump. The solution is thus advanced from each tank to the succeeding tank until it is discharged from the last tank through connection 17, and the connections are made in such manner that the fresh acid solution passes first into a tank containing ore which has been exhausted of its values and which has been subjected to leaching action for a maximum period of time and then passes progressively through succeeding tanks containing ore which has been exposed to leaching action for a less period of time, being finally applied to the fresh ore in the last tank of the series, and the process being so carried out that the leaching solution is rendered practically or substantially neutral by the action of the ore by the time it is discharged through the pipe 17. This substantially neutral solution passes into the tower 12 wherein it is brought into contact with sulfur dioxid gas passing upwardly through said tower, the solution falling or trickling down through the gas and being drawn off through pipe 16. With a substantially neutral solution of this character it is possible to obtain a reduction efficiency of nearly eighty per cent., that is to say, about eighty per cent. of the ferric iron in the solution is reduced to ferrous iron. One result of this reaction is to produce sulfuric acid as per the following equation:

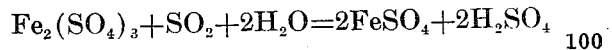

$$Fe_2(SO_4)_3 + SO_2 + 2H_2O = 2FeSO_4 + 2H_2SO_4$$

In general, however, it will be necessary to add a further quantity of sulfuric acid to make up for loss in tailings, etc., and this is effected in tank 21. In order to remove iron and base metal compounds accumulated in the solution during the cyclic leaching operation, so as to prevent fouling of the solution, a portion of the solution is drawn off from the leaching tanks through "bleeding" connections 35, and passed over metallic iron in the cement copper launder 36. The cement copper precipitated from the solution in this launder, or a portion thereof, is transferred to the device 22, which may be a tumbler or rotary barrel apparatus, adapted to bring the cement copper in contact with the solution passing from tower 12, so that any ferric sulfate remaining in the solution may be reduced to ferrous sulfate, the copper being at the same time taken up in solution. The solution passes from tower 12 through pipe 20 to said device 22 and thence through settling tank 23 to sump 21 wherein it is supplied with the required amount of sulfuric acid. From sump 21 the solution is forced by pump 26 to the storage tank 27, whence it passes to the electrolyzer 11 wherein copper is precipitated and sulfuric acid is produced in the solution. From the electrolyzer the solution circulates back to the sump 21. A portion of the acid solution from the cells is passed through pipe 31 to the first of the leaching tanks, and the neutral solution from the last tank returns to the sump after passing through the reduction tower, as above described, the process being carried out in such manner that the copper is supplied to the electrolyte by the leaching cycle as fast as it is removed by the electrolytic cycle.

The electrolytic apparatus 11 may be of any suitable type. For example it may comprise cells of the single compartment type, using copper cathodes and either lead or graphite anodes. When lead anodes are used, there is comparatively low conversion of ferrous to ferric sulfate in the electrolysis, so that by providing for reduction of ferric to ferrous sulfate in the neutral advance solution passing from the leaching tanks to the electrolyzer, it is possible to maintain the low concentration of ferric sulfate required for economical electrolysis, as above described. When graphite anodes are used, the conversion of ferrous to ferric sulfate in the electrolytic cells is comparatively high, so that in this case it may be desirable to provide for further reduction during the electrolytic cycle, in addition to the reduction of the neutral solution advanced from the leaching tanks. For this purpose, as shown in Fig. 4, a reducing tower 12' similar to the tower 12 may be provided in the electrolyte circulating system, in addition to the tower 12 in the leaching circulatory system.

In the above described process it is not attempted to remove all of the iron from the solution at any stage of the operation, the object of the process being mainly to keep the iron as far as possible in the ferrous state in passing through the electrolytic apparatus. The presence of some ferric sulfate in the leaching solution as it passes to the ore is of some advantage as, with some ores, ferric sulfate operates effectively as a leaching agent.

What we claim is:

1. The process of extracting copper from ores containing copper and iron, which consists in passing a solution of sulfuric acid in contact with the ore until the solution is substantially neutral, subjecting the substantially neutral solution to the action of sulfur dioxid to reduce ferric sulfate in the solution to ferrous sulfate, and then electrolyzing the resulting solution for recovery of copper therefrom.

2. The process of extracting copper from ores containing copper and iron, which consists in passing a solution of sulfuric acid in contact with the ore until the solution is substantially neutral, subjecting the substantially neutral solution to the action of sulfur dioxid to reduce ferric sulfate in the solution to ferrous sulfate, and then acidifying the solution and electrolyzing the resulting solution for recovery of copper therefrom.

3. The process of extracting copper from ores containing copper together with iron, which consists in leaching the ore with sulfuric acid solution, subjecting a portion of the resulting solution to the action of metallic iron to precipitate metallic copper therefrom, subjecting another portion of the solution to the action of sulfur dioxid to reduce ferric sulfate to ferrous sulfate, and then to the action of metallic copper precipitated as aforesaid, to reduce a further quantity of ferric sulfate to ferrous sulfate, and to dissolve such metallic copper, and then electrolyzing the solution to deposit copper therefrom.

JOHN C. GREENWAY.
HARRY W. MORSE.